United States Patent [19]

Sakai et al.

[11] Patent Number: 5,545,988

[45] Date of Patent: Aug. 13, 1996

[54] WAVEFORM SIGNAL PROCESSOR WITH SELECTIVE SAMPLING

[75] Inventors: Masanori Sakai; Katsuhiko Tomita; Joichiro Ezaki, all of Tokyo; Kazuo Suzuki, Musashino; Seiji Fukuda, Musashino; Kouichi Hatakeyama, Musashino, all of Japan

[73] Assignees: TDK Corporation; Nihon Techno Bute Limited, both of Tokyo, Japan

[21] Appl. No.: 305,368

[22] Filed: Sep. 13, 1994

[51] Int. Cl.⁶ .......................... G11B 5/455; G11B 20/24; G01R 23/16

[52] U.S. Cl. .................. 324/212; 324/76.21; 324/76.24; 327/551; 360/39; 364/574; 364/576; 369/60

[58] Field of Search ..................................... 324/210, 212, 324/76.21, 76.24, 76.33, 76.42, 76.77; 360/39, 55; 327/551; 364/485, 487, 574–576; 369/60

[56] References Cited

U.S. PATENT DOCUMENTS 4,710,686  12/1987  Guzik .
4,720,674  1/1988  Takeuchi et al. .................... 324/76.21

FOREIGN PATENT DOCUMENTS

| 59-167813 | 9/1984 | Japan . |
| 2-76114 | 3/1990 | Japan . |
| 2-76113 | 3/1990 | Japan . |
| 4-229408 | 8/1992 | Japan . |
| 5-6517 | 1/1993 | Japan . |

Primary Examiner—Gerard R. Strecker
Attorney, Agent, or Firm—Oblon, Spivak, McClelland, Maier & Neustadt, P.C.

[57] ABSTRACT

To perform digital processing of cyclical waveform signals that include random noise with high accuracy and high reliability without being practically affected by the noise. This is a waveform signal processor into which cyclical waveform signals are input and which outputs corresponding signals. It samples a cyclical waveform signal a plurality of times and then, based upon the obtained sampling values, it performs a Fourier Transform for all the various cycles. Next, the phase angle of a pre-selected frequency component in the Fourier series is determined based upon the Fourier Transform. Then a sampling point at the same phase for all cycles is specified by using the phase angle as a reference. The average of the sampling values at the same phase is calculated and output.

9 Claims, 7 Drawing Sheets

WAVEFORM SIGNAL PROCESSOR WITH SELECTIVE SAMPLING

BACKGROUND OF THE INVENTION

1. Field of the Invention

The present invention relates to a waveform signal processor effective in eliminating various random noise components contained in a cyclical waveform, and a device employing the waveform signal processsor. Random noise components are removed in preprocessing and the original signal waveform is extracted for output through digital processing. As examples of application, various types of waveform analyzers, oscilloscopes, and devices to measure the characteristics of recording media or heads can be cited.

2. Discussion of Background

Averaging processing is well known as a means for removing various random noise components contained in a cyclical waveform when digitally processing a cyclical waveform. The averaging processing is a method in which the cyclical waveform signal is sampled a plurality of times and the average of the sampling values obtained at the sampling points that correspond to the phases of the various cycles is determined. With this averaging processing, the noise components are practically removed.

In averaging processing, in order to improve the reliability of the obtained signal, it must be assured that the sampling points be the same for various cycles, and correspond to the same points on the time axis. In other words, the sampling points must correspond to the same phase when sampling the waveform to be measured. As a means for assuring this in the prior art, the average is taken by detecting the peak point, the zero cross point or the like, of a cyclical waveform, and by using this as a reference point on the time axis.

However, since the cyclical waveform which is the object of measurement contains various random noise components, the peak point or the zero cross point can vary due to these noise components. Because of this, it cannot be assured that the peak point or the zero cross point that is set as reference point on the time axis is, in fact, generated at precisely the same point on the time axis in each cycle.

SUMMARY OF THE INVENTION

It is an object of the present invention to provide a waveform signal processor that can perform waveform signal processing with high precision and reliability without being practically affected by noise when digitally processing a cyclical waveform that contains random noise.

It is a further object of the present invention to provide a device employing the aforementioned waveform signal processor.

In order to achieve the above described objects, the present invention is a waveform signal processor into which cyclical waveform signals are input and which outputs corresponding signals. An input cyclical waveform signal is sampled a plurality of times, a Fourier Transform is performed for each cycle based upon the obtained sampling values, the phase angle of the frequency component of a pre-selected harmonic in the Fourier series is determined based upon the Fourier Transform, a sampling point at which the phase is the same for all cycles is specified based upon the phase angle used for reference for all cycles and an average of the sampling values obtained at those sampling points for all cycles is output.

The aforementioned phase angle is inherent in the harmonics of the frequency component and is not affected by noise. For example, if the frequency component of the pre-selected harmonic in the Fourier series is the fundamental harmonic wave component, it is not affected by higher frequency noise of a high harmonic, and, as a result, the aforementioned phase angle can be used as a reference point on the time axis which is not subject to change caused by the varying noise in different cycles.

Sampling points at approximately the same phase are determined for each cycle with the aforementioned phase angle used as a reference and the average of the sampling values obtained at the sampling points is output for each cycle. With this, it is possible to obtain averages without generating deviations in the time reference caused by noise and to obtain sampling values of the waveform signal with noise removed.

As another means for achieving the objects, the aforementioned cyclical waveform signals are sampled a plurality of times, a Fourier Transform is performed for each cycle based upon the obtained sampling values, and, based upon the Fourier Transform, specific analog level values are obtained for a pre-selected frequency component in the Fourier series. A sampling point at which the analog level values are the same for all cycles is specified with the aforementioned analog level value for reference, and averages of the sampling values for all cycles obtained at that sampling point are output.

Obviously, the abovementioned alternative approach will have the same effect as the method in which the sampling points at which the phase angles are the same is specified. Consequently, by outputting the average value of the sampling values at the analog level obtained at the sampling point for each cycle in this manner, it is possible to obtain averages without generating deviations in the time reference caused by noise components and to obtain sampling values of the waveform signal with noise components removed.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings wherein.

DETAILED DESCRIPTION OF THE PREFERRED EMBODIMENTS

Figure 1:
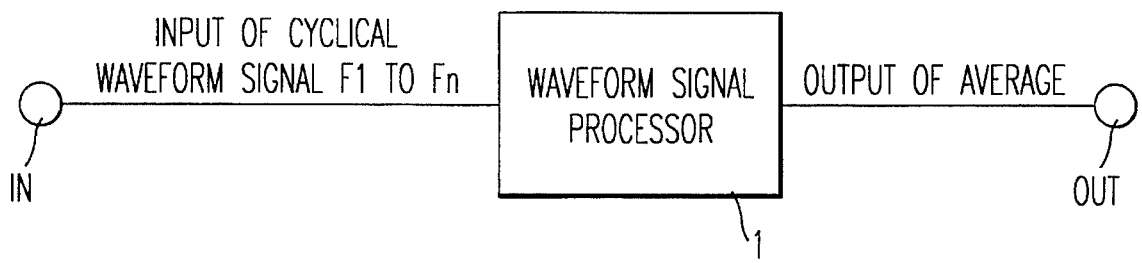
FIG. 1 illustrates the concept of the waveform signal processor according to the present invention.
Figure 2A:
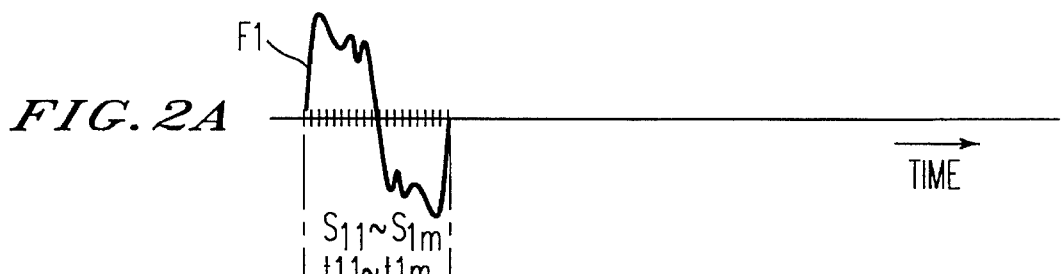
FIG. 2 illustrates the sampling processing of cyclical waveforms in the present invention.
Figure 2B:
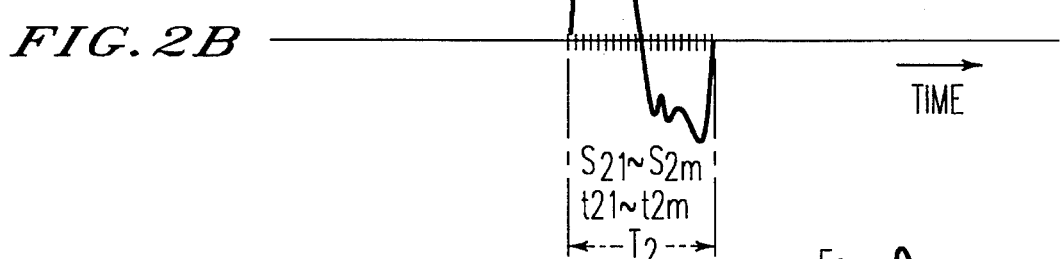
Figure 2C:
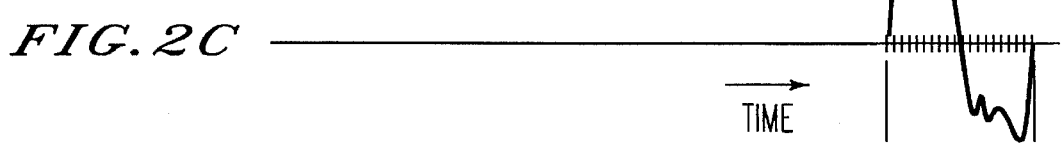
Figure 3:
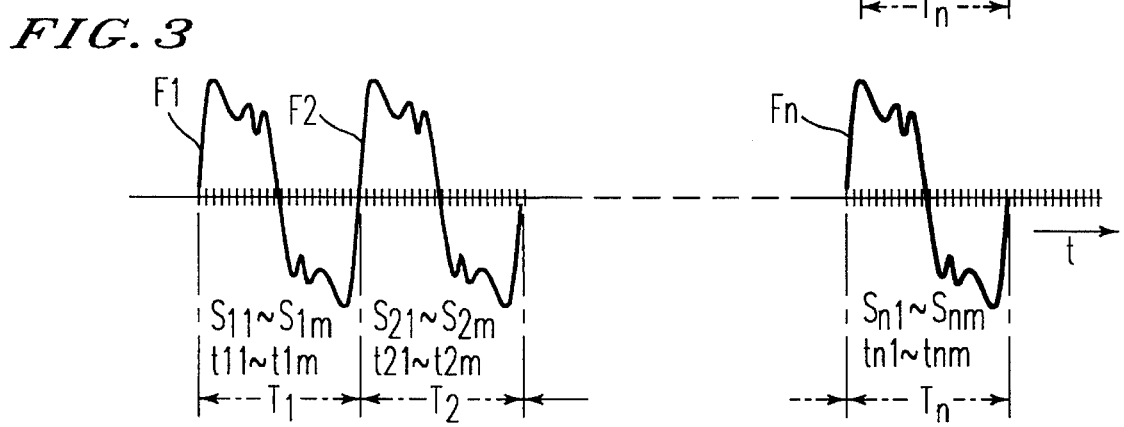
FIG. 3 illustrates the sampling processing of cyclical waveforms in the present invention.

In FIG. 1, reference number 1 indicates the waveform signal processor according to the present invention. IN is the input terminal and OUT is the output terminal. The cyclical waveform signals F1 to Fn are input to the input terminal IN. The signal that corresponds to the input cyclical waveform signals F1 to Fn are then output from the output terminal OUT. In the first step, the waveform signal processor 1 samples the cyclical waveform signals F1 to Fn a plurality of times to obtain the sampling values (S11 to S1m) to (Sn1 to Snm) as shown in FIG. 2. The sampling values (S11 to S1m) through (Sn1 to Snm) are obtained as digital quantities. The cyclical waveform signals F1 to Fn may either be generated discontinuously in time as shown in FIG. 2 or they may be generated continuously in time as shown in FIG. 3.

During the second step, based upon the obtained sampling values (S11 to S1m) through (Sn1 to Snm), a Fourier Transform is executed for each of the cyclical waveform signals F1 to Fn. The Fourier Transform performed in this case is either a discrete Fourier Transform (DFT) or a fast Fourier Transform (FFT). The DFT and FFT are often used when handling waveform signals. The Fourier series obtained through the Fourier Transform are expressed as follows:

First, regarding the waveform signal F1

$$F1(t)=a_{01}+a_{11}\cos \omega t+a_{12}\cos 2\omega t+a_{13}\cos 3\omega t+\ldots+a_{1m}\cos m\omega t+b_{01}+b_{11}\sin \omega t+b_{12}\sin 2\omega t+b_{13}\sin 3\omega t+\ldots+b_{1m}\sin m\omega t$$

Now, regarding the waveform signal F2

$$F2(t)=a_{02}+a_{21}\cos \omega t+a_{22}\cos 2\omega t+a_{23}\cos 3\omega t+\ldots+a_{2m}\cos m\omega t+b_{02}+b_{21}\sin \omega t+b_{22}\sin 2\omega t+b_{23}\sin 3\omega t+\ldots+b_{2m}\sin m\omega t$$

Likewise, regarding the waveform signal Fn $$Fn(t)=a_{0n}+a_{n1}\cos \omega t+a_{n2}\cos 2\omega t+a_{n3}\cos 3\omega t+\ldots+a_{nm}\cos m\omega t+b_{0n}+b_{n1}\sin \omega t+b_{n2}\sin 2\omega t+b_{n3}\sin 3\omega t+\ldots+b_{nm}\sin m\omega t$$

In the next step, based upon the Fourier Transform explained above, the phase angle of the pre-selected frequency component in the Fourier series is determined. If one takes the fundamental harmonic wave component ($\omega t$) as an example, the phase angles $\phi 1$ to $\phi n$ of the various waveform signals F1 to Fn are calculated as follows:

$$\phi 1 = \tan^{-1}(b_{11}/a_{11})$$
$$\phi 2 = \tan^{-1}(b_{21}/a_{21})$$
$$\vdots$$
$$\phi n = \tan^{-1}(b_{n1}/a_{n1})$$

Figure 4A:
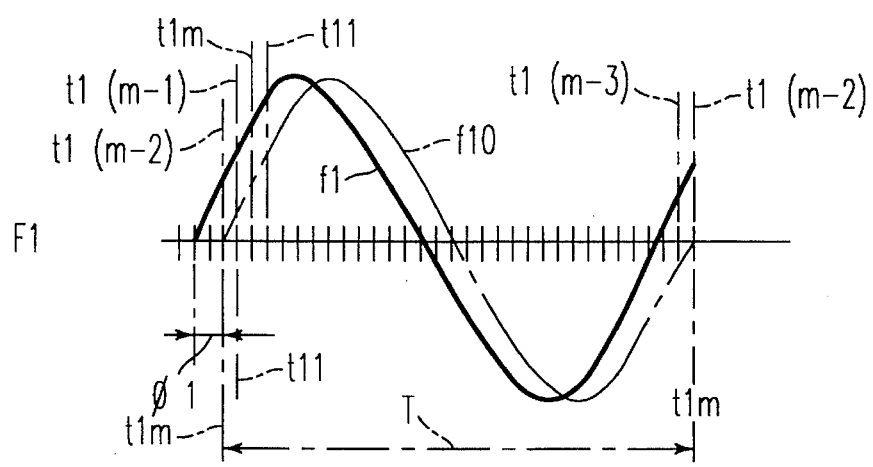
FIG. 4 shows the relationship between the fundamental order wave components and phase angles for various cycles in the waveform signal processor according to the present invention.
Figure 4B:
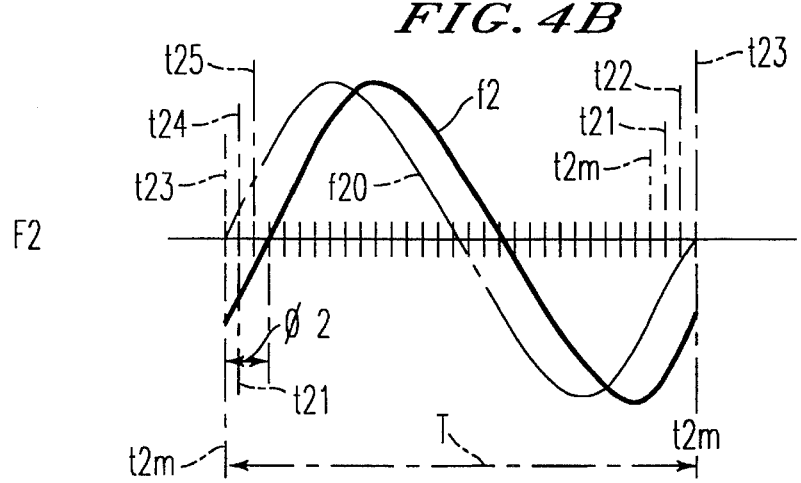
Figure 4C:
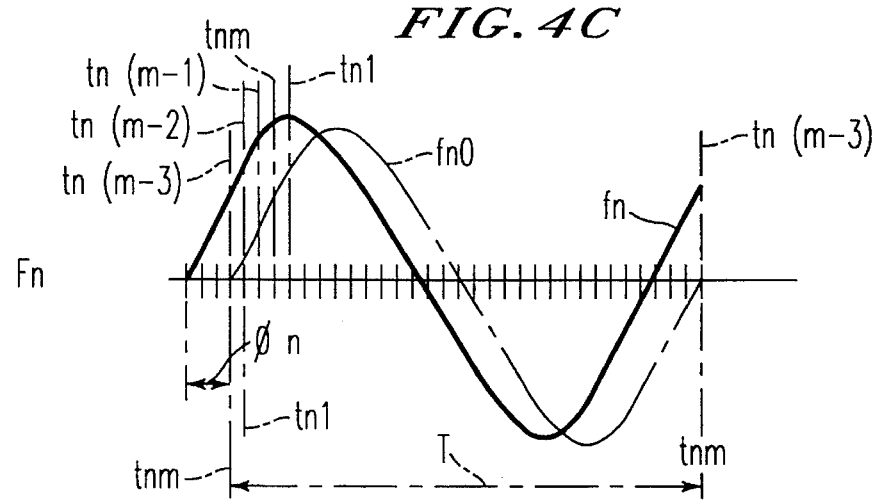

FIG. 4 shows the relationship between the fundamental harmonic wave components f1 to fn and the phase angles $\phi 1$ to $\phi n$ for the cyclical waveform signals F1 to Fn. In the next step, with the phase angles $\phi 1$ to $\phi n$ used as reference, the sampling points at the same phase in each of the cyclical waveform signals F1 to Fn are determined. For example, since the phase angle $\phi 1$ in the waveform signal F1 is advanced by an equivalent of 2 sampling points, a shift is made in the direction in which the phase is delayed by the equivalent of 2 sampling points. The waveform signal f10, indicated with a 1-point chain line, shows the waveform obtained through the phase matching described above. The train of sampling points after the phase matching seen on the waveform signal F10 are in the sequence;

$$t1(m-1), t1m, t11, \ldots t1(m-2)$$

Since the phase angle $\phi 2$ in the waveform signal F2 is delayed by the equivalent of 3 sampling points, a shift is made in the direction in which the phase is advanced by the equivalent of 3 sampling points. The waveform signal f20, indicated with a 1-point chain line, shows the waveform obtained through the phase matching described above. The train of sampling points after the phase matching seen on the waveform signal f20 are in the sequence;

$$t24, t25, \ldots t2m, t21, t22, t23$$

Likewise, since the phase angle $\phi n$ in the waveform signal Fn is advanced by the equivalent of 3 sampling points, a shift is made in the direction in which the phase is delayed by the equivalent of 3 sampling points. The waveform signal f2n, indicated with 1-point chain line, shows the waveform obtained through the phase matching described above. The train of sampling points after the phase matching seen on the waveform signal fn0 are in the sequence;

$$tn (m-2), tn (m-1), tnm, tn1 \ldots tn(m-3)$$

In the next step, the averaging of the sampling values obtained at the sampling points at the same phase for each of the waveform signals F1 to Fn is calculated and output. In the example above, the average at the first sampling point is obtained by adding the sampling value S1 (m−1) which is obtained at the sampling point t1 (m−1) in the waveform signal F1, the sampling value S24 which is obtained at the sampling point t24 in the waveform signal F2 and so on, and finally the sampling value Sn(m−2) which is obtained at the sampling point tn(m−2) in the waveform signal Fn, and then by averaging them. In other words, the average S1 is calculated;

$$S1=\{S1(m-1)+S24+\ldots+Sn(m-2)\}/n$$

The average S2 at the second sampling point is calculated;

$$S2=\{S1\ m+S25+\ldots+Sn(m-1)\}/n$$

And so on, and the average Sm at the (m)th sampling point is calculated;

$$Sm=\{S1(m-2)+S23+\ldots+Sn(m-3)\}/n$$

The cyclical waveform signal is sampled a plurality of times, a Fourier Transform is performed for each cycle based upon the obtained sampling values and the phase angle of a pre-selected frequency component in the Fourier series is determined based upon the Fourier Transform. This phase angle is inherent in the multiple of the frequency component and is not affected by noise. As a result, the aforementioned phase angle can be used as a reference point on the time axis which is not subject to change caused by the noise in the various cycles.

Also, sampling points at the same phase are determined for various cycles with the phase angle used as a reference and the averaging of the sampling values obtained at the sampling points is calculated and output for each cycle. With this, it is possible to obtain an average without generating deviations in the time reference caused by noise, and to obtain waveform signals with noise removed.

Figure 5:
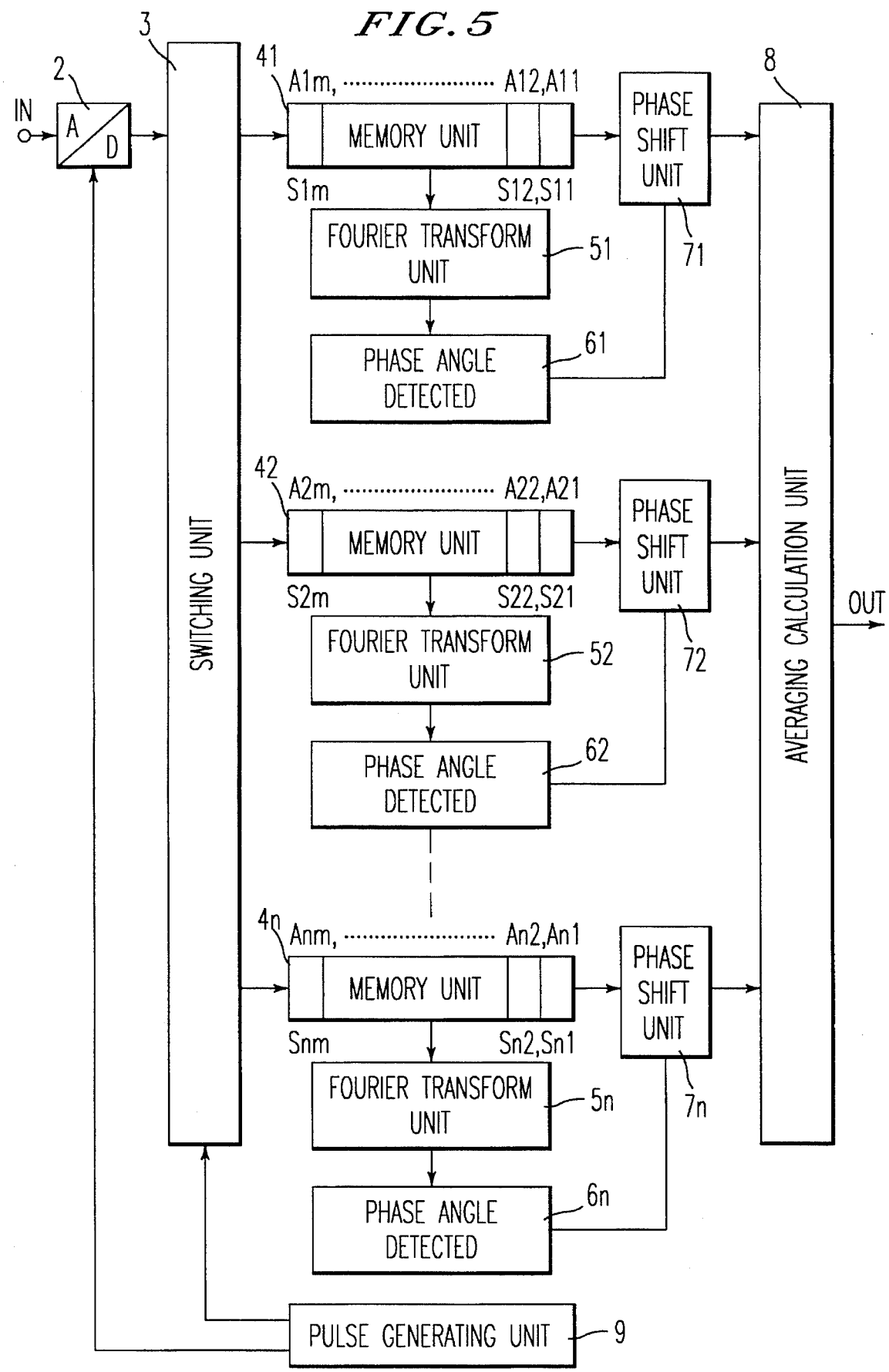
FIG. 5 shows a conceptual structure of the waveform signal processor according to the present invention.
Figure 6:
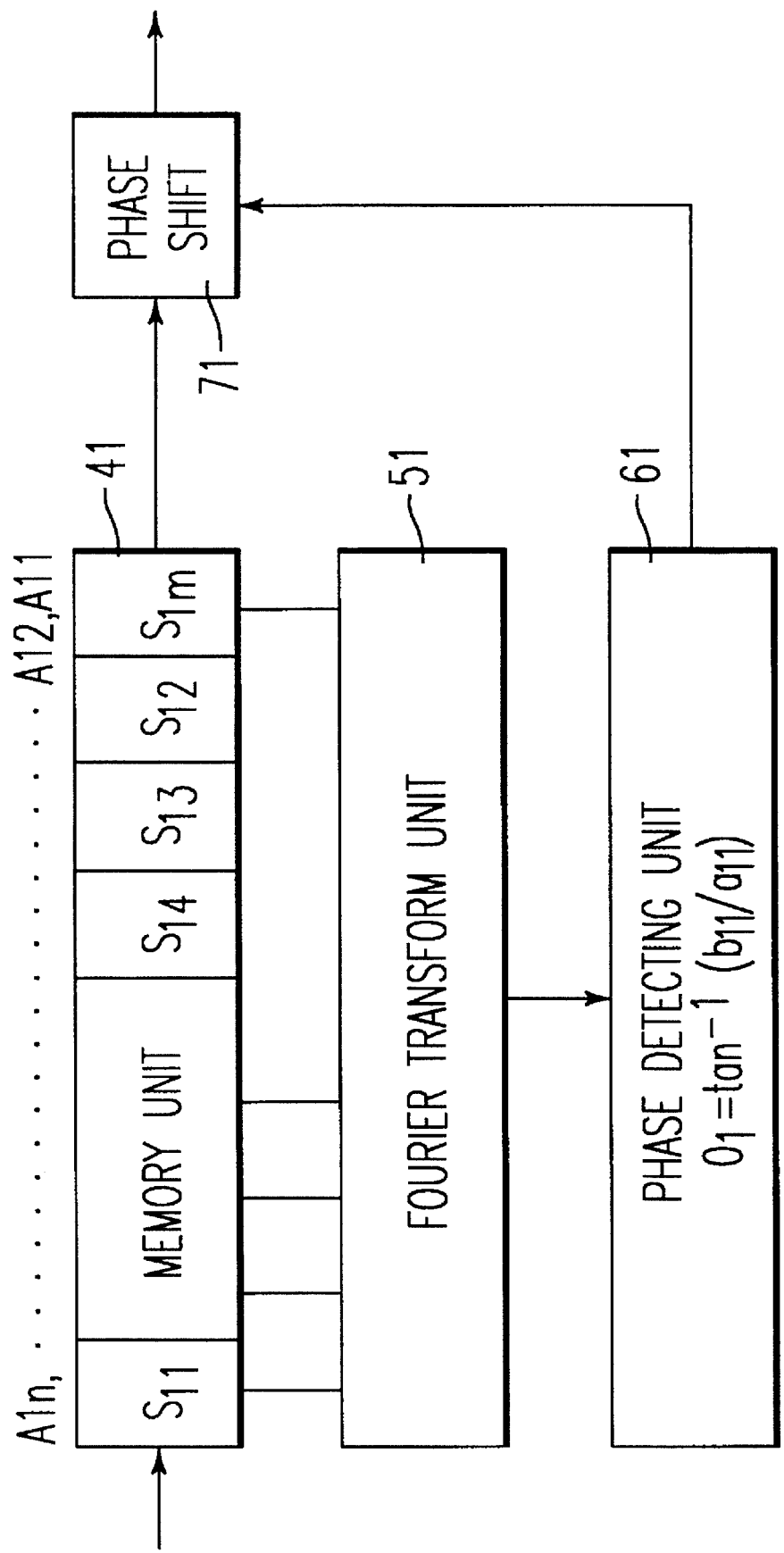
FIG. 6 shows part of the waveform signal processor shown in FIG. 5.

FIG. 5 is a block diagram that illustrates the conceptual structure of a waveform signal processor according to the present invention and FIG. 6 is a block diagram of part of the waveform signal processor shown in FIG. 5. Reference number 2 indicates the analog/digital conversion unit (hereafter referred to as the A/D conversion unit), 3 indicates the switching unit, 4l to 4n are the memory units, 5l to 5n are the Fourier Transform units, 6l to 6n are the phase angle determining units, 7l to 7n are the phase shift units, 8 indicates the average calculation unit and 9 indicates the pulse generating unit. Although it is not shown in the figures, the processor is provided with a control unit that performs unified, overall control. Also, the various components may be structured as parts of a computer and in that case, the various components may be understood to represent various processing steps.

The A/D conversion unit 2 samples the cyclical waveform signal which is input to the input terminal IN, converts the sampling values into digital quantities and then outputs them. The switching unit 3 divides the sampling values sent from the A/D conversion unit into groups for the corresponding cycles and outputs them. Therefore, when the sampling values for (n)cycles are obtained, the switching unit 3 should be provided with (n) number of output terminals.

Memory units 4l to 4n are provided to correspond to the number of outputs at the switching unit 3. Each of the memory units 4l to 4n stores sampling values for each cycle and is structured of, for example, RAM. The sampling values are stored in memory at addresses A1 to Am in the memory units 4l to 4n for each sampling point.

The Fourier Transform units 5l to 5n perform a Fourier Transform for each cycle based upon the obtained sampling values. The type of Fourier Transform executed here is either the aforementioned discrete Fourier Transform (DFT) or the fast Fourier Transform (FFT).

The phase detecting units 6l to 6n determine the phase angles of a pre-selected frequency component in the Fourier series with the Fourier Transform. Generally, the phase angle of the fundamental harmonic wave component is determined. However, as described above, it goes without saying that the phase angles of frequency components of other harmonics may be determined.

The phase shift units 7l to 7n specify the sampling points at the same phase for the various cycles by using the phase angle as reference. The averaging calculation unit 8 calculates the average of the sampling values obtained at the sampling points at the same phase in various cycles and outputs it. The phase shifting performed by the phase shift units 7l to 7n and the averaging performed by the averaging calculation unit 8 are as described earlier.

An alternative approach involves obtaining a specific analog level value, for instance the peak value or the 50% level value for frequency components of a pre-selected harmonic in the Fourier series based upon the Fourier Transform and specifying the sampling point at which the analog level values are approximately the same for various cycles using the aforementioned analog level value for reference. Obviously, this will have the same effect as the method in which the sampling point at which the phase angles are the same is specified.

The waveform signal processor according to the present invention can be used in various types of waveform analyzers, oscilloscopes or recording devices. When it is used in a recording device, in particular, as a characteristics measuring device for magnetic disks and heads, after processing the analog waveform signal output from a magnetic head with the waveform signal processor according to the present invention, it is possible to perform TAA measurement, resolution measurement, overwrite characteristics measurement, S/N ratio measurement, PW 50 measurement, ETW measurement, wiggle measurement, isolated waveform measurement and the like by using the output.

Figure 7:
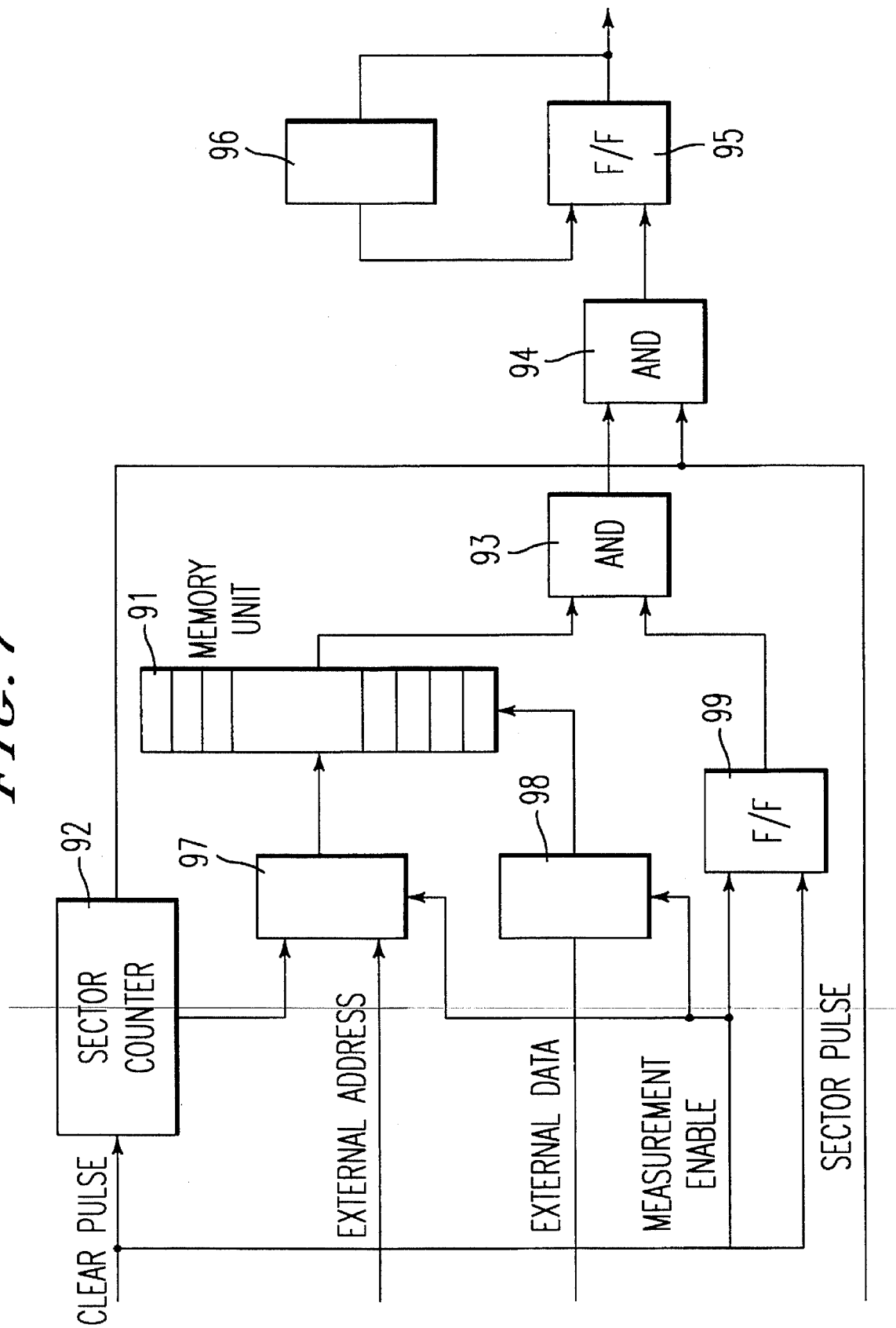
FIG. 7 shows an example of a pulse generating unit in a magnetic disc device employing the waveform signal processor according to the present invention.

FIG. 7 shows an example of the pulse generating unit 9 in an application when the waveform signal processor according to the present invention is employed in a characteristics measurement device for magnetic disks and heads. In the figure, reference number 91 indicates the memory unit, 92 indicates the sector pulse counter, 93 and 94 indicate the AND gates, 95 indicates a flip-flop, 96 indicates the pulse width setting circuit, 97 indicates a multiplexer, 98 indicates the buffer circuit and 99 indicates a flip-flop. External address signals, external data signals, the measurement enable signal and a clear pulse are sent by an external device (not shown), for example, a computer. The sector pulse is given as the rotating angle signal of the rotating motor (not shown) that rotates and drives the magnetic disk.

The operation of the pulse generating unit 9 described above involves two steps. In the first step, the information as to whether or not waveform signal processing should be performed for each sector, which is set for each track on the magnetic disk, is stored in the memory unit 91. In the first step, the processing with which the external data supplied by the computer (not shown) are stored in memory at the specific addresses of the memory unit 91 based upon the external addresses also supplied by the computer, is performed. At this point, the addresses in the memory unit 91 correspond to the sector addresses and the data stored in the memory unit 91 correspond to the information as to whether or not the waveform signal processing should be performed for specific sectors. The measurement enable signal is set at the logical value "1", which corresponds to measurement disable.

The second step succeeds the first step when it is completed. In the second step, the contents of the memory unit 91 are read out and the information as to whether or not it is necessary to perform waveform processing for each sector is output. The measurement enable signal is set to the logical value "0", which corresponds to a measurement enable. With this, writing of external addresses and external data into the memory unit 91 is disabled. At the same time, by driving a magnetic disk device (not shown), the sector pulse is supplied for each specific rotating angle from the rotating motor or the like that constitutes the magnetic disk device. The sector pulse is supplied to the AND gate 94 and the sector pulse counter 92. The sector pulse counter 92 counts the supplied sector pulse and then supplies corresponding address-specifying signal to the memory unit 91 via the multiplexer 97. With this, the contents of the memory unit 91, that is, whether or not it is necessary to perform waveform signal processing for each sector, are read out. The information that is read out from the memory unit 91 is sent to the AND gate 93. The AND gate 93 is also gated with the flip-flop 99 output that shows the measurement enable state. The AND gate 94 then opens timed with the sector pulse that is input to the AND gate 94. Thus, the flip-flop 95 is set and the measurement pulse signal that includes whether or not waveform signal processing is required is output. The flip-flop 95 is reset by the pulse width setting signal supplied by the pulse width setting circuit 96. The measurement pulse signal is used for the operation of the A/D conversion unit 2 and the switching unit 3 shown in FIG. 5.

Figure 8:
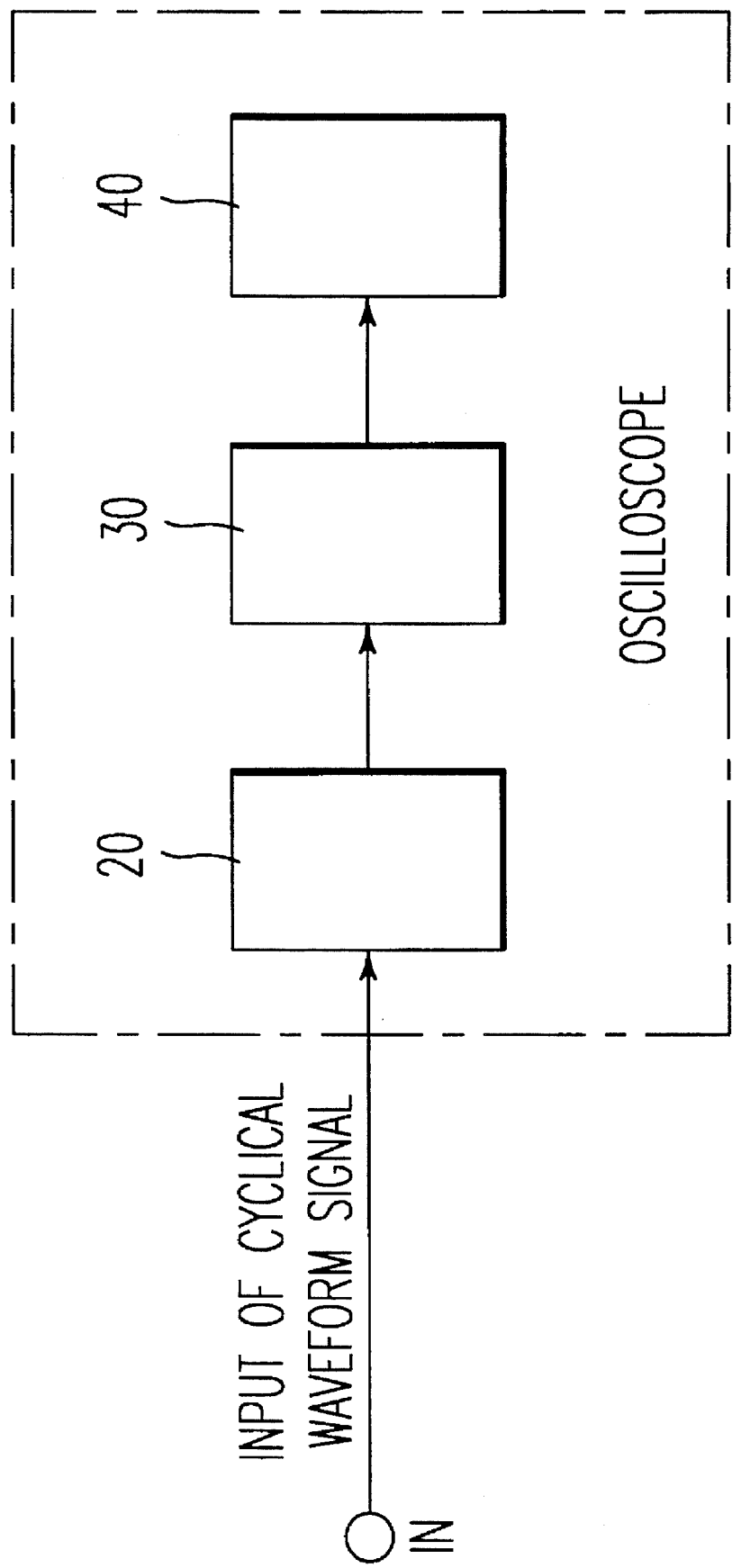
FIG. 8 illustrates an embodiment of an oscilloscope employing the waveform signal processor according to the present invention.

FIG. 8 shows an example of an application when the waveform signal processor according to the present invention is employed in an oscilloscope. In the figure, reference number 20 indicates the waveform signal processor according to the present invention, 30 indicates the main circuit and 40 indicates a display.

Figure 9:
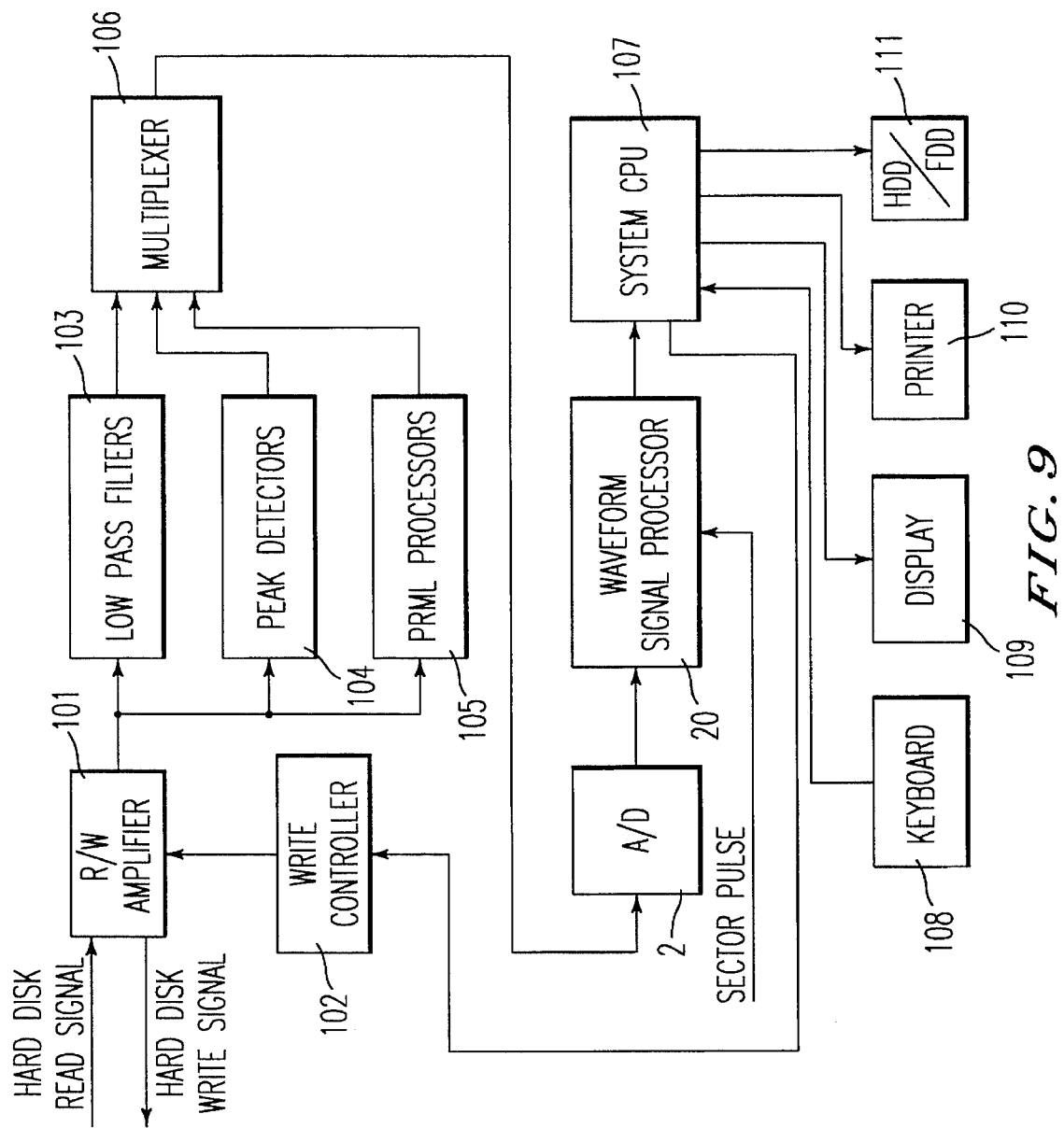
FIG. 9 illustrates a block diagram showing an overall configuration of a device for measuring the characteristics of a magnetic disk and a magnetic head.

FIG. 9 is a block diagram that shows an overall configuration of a characteristics measuring device that measures the characteristics of a magnetic disk and a magnetic head.

A recording signal is written onto the magnetic disk by the magnetic head (neither is shown) by first coding the signal to be recorded with the write controller 102 based upon instructions from the system CPU 107, then sending the coded signal to the read/write amplifier (R/W Amp.) 101 and supplying the write signal to the magnetic head from the R/W Amp. 101.

In the read operation from the magnetic disk, the magnetically recorded data on the magnetic disk are read by the magnetic head and the read signal is sent to the R/W Amp. 101 to be amplified. On the next stage of the R/W Amp. 101, the low pass filters 103, the peak detectors 104 and the PRML (partial response maximum likelihood) processors 105 are connected in parallel and on the next stage of those, the muliplexer 106 is connected. The signal, which is amplified by the R/W Amp. 101, is sent to the multiplexer 106 via the filters 103, the peak detectors 104 or the PRML processors 105. From these signals, sent via the low pass filters 103, the peak detectors 104 or the PRML processors 105, the multiplexer 106 selects the signal depending on the measuring purpose. The read signal that has been selected by the multiplexer 106 is sent to the waveform signal processor 20 via the A/D converter 2 where the waveform signal processing according to the present invention is executed.

The waveform data on which the waveform signal processing has been performed are then handed over to the system CPU 107, which manages the entire system, and then are output via the display 109, the printer 110, the magnetic disk device (HDD/FDD) 111 or the like in response to instructions issued via the keyboard 108 or the like.

The details of this processing include a variety of operations including outputting the entire waveform of the head/disk read signal, outputting the peak values and the average values of the waveform and outputting the half band width PW 50, or the average value of the waveform, depending upon the purpose of measurement.

As a result, with the waveform signal processor and the characteristics measuring device according to the present invention, the restrictions upon characteristics measurements in the prior art, whereby only the peak values or the half level width of an analog waveform could be obtained, are overcome and the analog values of an entire waveform can be obtained as high-fidelity, undistorted digital data with the noise removed. In PRML, which is one of the latest and most promising technologies in magnetic recording, optical recording and telecommunications where high-density recording, high-speed reading and high transfer rates are in demand, it is highly desirable to have an accurate grasp of intersymbol interference, distortion and analog values at specific positions in the waveform. Therefore, the present invention, which makes it possible to obtain the analog values of an entire waveform as digital data without noise or distortion and with high-fidelity, is very useful in research and development of PRML and related technology and also in characterization of a head and a disk.

While the invention has been particularly shown and described with reference to prefered embodiments, thereof, it will be understood by those skilled in the art that various changes in form and detail may be made therein without departing from the spirit, scope and teaching of the invention.

What is claimed is:

1. A method for processing a cyclical input waveform signal and outputting a corresponding signal; comprising the steps of:

sampling plural cycles of said cyclical input waveform signal a plurality of times each cycle;

performing a Fourier transform for each sampled cycle of said cyclical input waveform signal based upon the obtained sampling values;

determining the phase angle of a preselected frequency component in the Fourier series based upon said Fourier transform for each sampled cycle of the input waveform signal;

shifting in time the sampling points of each of said cycles of the input waveform signal based on the respective phase angle determined for the respective cycle so that corresponding sampling points of each cycle are at the same phase; and outputting averages of the sampling values at the corresponding sampling points at the same phase for each of said cycles.

2. A method for processing a cyclical input waveform signal and outputting a corresponding signal, comprising the steps of:

sampling plural cycles of said cyclical input waveform signals a plurality of times each cycle;

performing a Fourier transform for each sampled cycle of said cyclical input waveform signal based upon the obtained sampling values;

obtaining for each cycle analog level values for a preselected frequency component in the Fourier series based upon said Fourier transform;

determining from the analog level values obtained in the preceding step, for each cycle, a characteristic sampling point corresponding to the same phase in said frequency component; and outputting averages of sampling values of corresponding sampling points at the same phase, for each of said cycles, obtained in relation to said characteristic sampling point for each phase.

3. A waveform signal processor for processing a cyclical input waveform and outputting a corresponding signal comprising:

a first means for sampling plural cycles of said cyclical input waveform signal a plurality of times for each cycle;

a second means for performing a Fourier transform for each sampled cycle of said cyclical input waveform signal based upon the obtained sampling values;

a third means for determining the phase angle of a preselected frequency component in the Fourier series based upon said Fourier transform of each cycle of the cyclical input waveform signal;

a fourth means for shifting in time the sampling points of each of said cycles of the input waveform signal based on the respective phase angle determined for the respective cycle so that corresponding sampling points of each cycle are at the same phase; and a fifth means for outputting averages of the sampling values at the corresponding sampling points having the same phase for each of said cycles.

4. A waveform signal processor for processing a cyclical input waveform and outputting a corresponding signal, comprising:

a first means for sampling plural cycles of said cyclical input waveform signal a plurality of times of each cycle;

a second means for performing a Fourier transform for each sampled cycle of said cyclical input waveform signal based upon the obtained sampling values;

a third means for obtaining for each cycle analog level values for a preselected frequency component in the Fourier series based upon said Fourier transform;

a fourth means for determining from the analog level values obtained by the third means, for each cycle, a characteristic sampling point corresponding to the same phase in each said frequency component; and a fifth means for outputting averages of sampling values of corresponding sampling points of the input waveform signal at the same phase for all cycles obtained in relation to said characteristic sampling point.

5. The waveform signal processor according to claim 3 or claim 4, further comprising:

an oscilloscope which inputs the cyclical input waveform.

6. The waveform signal processor according to claim 3 or claim 4, wherein, the cyclical input waveform is input from signals of a recording medium.

7. The waveform signal processor according to claim 6, wherein said recording medium is a magnetic recording medium.

8. The waveform signal processor according to claim 3 or claim 4, further comprising:

a head for a recording medium which inputs the cyclical input waveform.

9. The waveform signal processor according to claim 5, wherein said head is a magnetic head.

\* \* \* \* \*